United States Patent
Chen et al.

(10) Patent No.: US 9,996,643 B2
(45) Date of Patent: Jun. 12, 2018

(54) INTEGRATED CIRCUIT MODELING METHOD USING RESISTIVE CAPACITANCE INFORMATION

(71) Applicant: TAIWAN SEMICONDUCTOR MANUFACTURING COMPANY, LTD., Hsinchu (TW)

(72) Inventors: Chin-Sheng Chen, Taoyuan (TW); Tsun-Yu Yang, Changhua (TW); Wei-Yi Hu, Zhubei (TW); Jui-Feng Kuan, Zhubei (TW); Ching-Shun Yang, Zhudong Township (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 427 days.

(21) Appl. No.: 14/543,352

(22) Filed: Nov. 17, 2014

(65) Prior Publication Data
US 2016/0140271 A1 May 19, 2016

(51) Int. Cl.
*G06F 17/50* (2006.01)
(52) U.S. Cl.
CPC ...... *G06F 17/5022* (2013.01); *G06F 17/5045* (2013.01)
(58) Field of Classification Search
CPC .................. G06F 17/5022; G06F 17/5045
See application file for complete search history.

(56) References Cited

U.S. PATENT DOCUMENTS

| | | | | |
|---|---|---|---|---|
| 5,463,561 A * | 10/1995 | Razdan | ............... | G06F 17/5022 716/103 |
| 6,292,766 B1 * | 9/2001 | Mattos | ............... | G06F 17/5036 703/14 |
| 7,110,933 B2 * | 9/2006 | Lowther | ............. | G06F 17/5036 703/14 |
| 7,237,209 B2 * | 6/2007 | Strickland | ........... | G06F 17/5045 716/112 |
| 8,261,228 B1 * | 9/2012 | Gopalakrishnan | .. | G06F 17/5036 703/14 |
| 8,701,055 B1 * | 4/2014 | Lee | ..................... | G06F 17/5081 716/122 |
| 8,719,745 B2 * | 5/2014 | Ting | ........................ | G06F 19/00 716/102 |

(Continued)

Primary Examiner — Naum B Levin
(74) Attorney, Agent, or Firm — Hauptman Ham, LLP (57) ABSTRACT

A method of modeling an integrated circuit comprises generating a schematic of an integrated circuit comprising a first circuit component. The schematic comprises a first representation of the first circuit component. The method also comprises replacing the first representation with a second representation of the first circuit component. The second representation includes resistive capacitance information (RC) for the first circuit component. The RC information is based on first RC data included in a process design kit (PDK) file and second RC data included in a macro device file. The second RC data is based on a relationship between the first circuit component and a second circuit component. The method further comprises selectively coloring the second representation of the first circuit component in the schematic based on the RC information. The coloring of the second representation is indicative of whether the integrated circuit is in compliance with a design specification.

20 Claims, 4 Drawing Sheets

(56) References Cited

U.S. PATENT DOCUMENTS

| | | | | |
|---|---|---|---|---|
| 8,726,209 | B1* | 5/2014 | Lamant | G06F 11/3664 716/102 |
| 8,732,640 | B1* | 5/2014 | Krishnan | G06F 17/5081 716/110 |
| 8,756,048 | B2* | 6/2014 | Greco | G06F 17/50 703/20 |
| 8,762,921 | B2* | 6/2014 | Cordovez | G06F 17/5068 716/110 |
| 8,782,570 | B1* | 7/2014 | Li | G06F 17/50 716/51 |
| 8,782,577 | B2* | 7/2014 | Fischer | G06F 17/5068 716/100 |
| 8,918,749 | B2* | 12/2014 | Kugel | G06F 17/5072 716/110 |
| 9,092,589 | B2* | 7/2015 | Chai | G06F 17/5081 |
| 9,122,833 | B2* | 9/2015 | Chen | G06F 17/5081 |
| 9,330,219 | B2* | 5/2016 | Yang | G06F 17/5068 |
| 9,390,218 | B2* | 7/2016 | Lee | G06F 17/5081 |
| 2004/0107214 | A1* | 6/2004 | Hung | G06F 17/30864 |
| 2005/0028113 | A1* | 2/2005 | Lin | G06F 17/5068 716/55 |
| 2013/0298092 | A1* | 11/2013 | Ting | G06F 19/00 716/102 |
| 2013/0311965 | A1* | 11/2013 | Cordovez | G06F 17/5068 716/133 |
| 2015/0278419 | A1* | 10/2015 | Yang | G06F 17/5068 716/119 |

* cited by examiner

INTEGRATED CIRCUIT MODELING METHOD USING RESISTIVE CAPACITANCE INFORMATION

BACKGROUND

The recent trend in miniaturizing integrated circuits (ICs) has resulted in smaller devices that consume less power, yet provide more functionality at higher speeds. The miniaturization process has also resulted in stricter design and manufacturing tolerances. Pre-manufacture checking and testing are performed to make sure that a semiconductor device can be made and will function as designed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Integrated circuits are formed of multiple material layers and include various active devices such as transistors and/or other devices such as resistors, capacitors, or other suitable circuit components. These devices are often formed using one or more material layers formed over and/or within a substrate. Patterning techniques are used to pattern each of several material layers to form the various components and interconnect them through dielectric materials.

Techniques have been developed to represent integrated circuit designs at various levels of abstraction. According to these techniques, a designed integrated circuit is capable of being represented as a schematic diagram or as a layout. A schematic diagram is an electronic diagram of a designed integrated circuit. Schematic diagrams often include symbols that represent circuit components such as transistors, resistors, capacitors, or other circuit components. Schematic diagrams also often include representations of the connections between the circuit components included in the schematic diagram. A layout is a representation of an integrated circuit in terms of planar geometric shapes that correspond to the patterns of materials such as metal, oxide, or semiconductor layers that make up the components of the integrated circuit. To form an integrated circuit, a layout of each of several different device layers is often generated from the schematic.

The connections between the circuit components, or "wires" between the circuit components, are referred to as nets. Schematic netlists are lists that include an inventory of the circuit components included in the schematic. Each occurrence of a circuit component in an integrated circuit is referred to as an instance. Schematic netlists include information such as instance parameters that describe various attributes and/or properties of each instance of the circuit components included in the netlist. Schematic netlists also include an inventory of the connections between the circuit components (i.e., nets). Schematic netlists are sometimes stored as netlist files in databases accessible by electronic design automation (EDA) tools.

Integrated circuit designers often rapidly design and verify circuits, with extensive use of standard, reusable components and design flows. EDA tools allow designers to develop an integrated circuit design at the schematic level and verify performance at the schematic level via a pre-layout simulation. If the pre-layout simulation demonstrates that the integrated circuit design at the schematic level meets specified performance characteristics, EDA tools generate a layout and perform verification tasks such as design rule checks (DRC) and/or layout versus schematic (LVS) checks.

LVS checks determine whether a particular integrated circuit layout corresponds to the schematic or circuit diagram of the design. LVS checks recognize the shapes of the layout that represent the electrical components of the circuit, and vice versa, as well as the connections between the components creating a layout netlist. The layout netlist that represents the shapes of the layout that represent electrical components is compared by the LVS check against a netlist of the schematic or circuit diagram.

Design rule checks compare the layout to a set of design rules that satisfy a series of recommended parameters set forth by an integrated circuit manufacturer to ensure that a manufactured integrated circuit meets design operation parameters and functional requirements.

Design rule sets specify certain geometric and connectivity restrictions to ensure sufficient margins to account for variability in the manufacturing process. LVS checks are often performed after the DRC is complete. EDA tools often perform LVS checks by extracting the circuit components and the connections between the circuit components and generating a layout netlist. The EDA tool then compares the layout netlist to the schematic netlist. If the layout netlist and the schematic netlist match within a specified tolerance or are identical, then the layout is "LVS clean."

After the layout passes the DRC and is "LVS clean," EDA tools often run a post-layout simulation to estimate overall circuit performance which includes extracting resistance capacitance (RC) values from the layout. EDA tools then often assign one or more color schemes to the various circuit components in the generated layout that represent the extracted RC values so that a designer is able to visually assess the RC values of the integrated circuit at the layout stage.

Extracted RC values are an important factor when assessing circuit performance, particularly when high precision and/or high-speed circuits are laid out. RC values, and other parasitic effects, often exist, because of the arrangement and proximity of the components and interconnect features included in an integrated circuit. For a designed integrated circuit to reach the post-layout simulation stage, a designer often goes through numerous iterations of schematic design, pre-simulation, layout generation, DRC, and/or LVS checks only to learn at the post-layout stage that the designed integrated circuit has RC values that render the integrated circuit design inoperable or undesirable. The designer then has to start over.

Many EDA tools are not capable of modeling integrated circuits, and the components thereof, while taking connected or nearby circuit components such as back end of line (BEOL) components and/or connections into consideration when determining RC values. EDA tools without such design capabilities often output imprecise pre-layout simulation results, which increases the amount of time a designer spends when designing, and simulating the performance of, an integrated circuit.

Some EDA tools make it possible for a designer to manually input estimated RC values for circuit components at the schematic generation stage based on experience or knowledge. Knowing RC values at the schematic generation stage helps a designer to estimate or control what the ultimate RC values for the integrated circuit design will be at the post-layout simulation stage. While manual entry may make it more likely that an integrated circuit design that makes it to the post-layout stage will have desirable RC values, designers find it difficult to keep track of the input RC values at the schematic generation stage.

Some EDA tools maintain one circuit schematic without parasitic components in a database, use the same schematic to generate a layout, and use the same schematic in the LVS check. A separate circuit schematic with a pre-estimate of parasitic components is sometimes maintained and used to test for estimated RC values. Performance simulations of an integrated circuit that are based on pre-estimated RC values, however, are inaccurate. Pre-estimated RC values are fixed and lack information regarding RC values associated with actual connections and/or nearby circuit components. Rather, pre-estimated RC values include RC values for a circuit component that are based on likely combinations of BEOL connections and/or nearby circuit components.

Designers also find it difficult to estimate the effect circuit components have on the RC values of other nearby circuit components. For example, the coupling effect between nearby circuit components often influences RC values, which degrades overall circuit performance. But, such effects are not usually known until the post-layout simulation stage, if at all, because designers have a difficult time compounding the coupling effect with manually input RC values at the schematic generation stage. Even further, designers often find it difficult to generate a layout that has the pre-defined input RC values that passes the DRC and LVS check. In addition to these difficulties, manually inputting RC values at the schematic generation stage is not only time consuming, but manual entry also provides an opportunity to introduce inaccuracies into the schematic that might not be discovered until the post-layout simulation stage.

Some EDA tools interface with process design kits (PDK) that provide information about one or more circuit components that are included in an integrated circuit. A PDK is a set of files used within the semiconductor industry to model circuit components such as transistors, for example, for a certain technology for a certain foundry. Various types of PDK libraries or databases are often used with different EDA tools to design and simulate the performance of an integrated circuit. When a schematic of an integrated circuit is designed, some EDA tools are configured to query a PDK library for PDK files associated with a circuit component of the designed integrated circuit. Information from the PDK file is then imported into the schematic. For example, a symbol representing a selected circuit component in the schematic is sometimes replaced with a symbol provided for in a PDK file associated with the selected circuit component. Information from the PDK file is sometimes used in rendering the schematic and/or in a pre-layout simulation. The information included in the PDK file is stored, for example, in a model card.

PDK files include model cards that comprise information about circuit components such as device parameters comprising dimension, material, estimated RC values, design rules, or other suitable descriptive information that corresponds to the design, manufacture, and/or operation of a circuit component. Conventional model cards, however, do not cover parasitic color BEOL RC effects. As such, the lack of coloring and BEOL RC effect information often results in inaccurate device performance at the pre-layout simulation stage.

These difficulties, inaccuracies, and opportunities for error often result in a gap between the schematic and layout of the design integrated circuit, making the designer conduct multiple iterations of the design process from schematic to layout, which makes the integrated design process less efficient.

Figure 1:
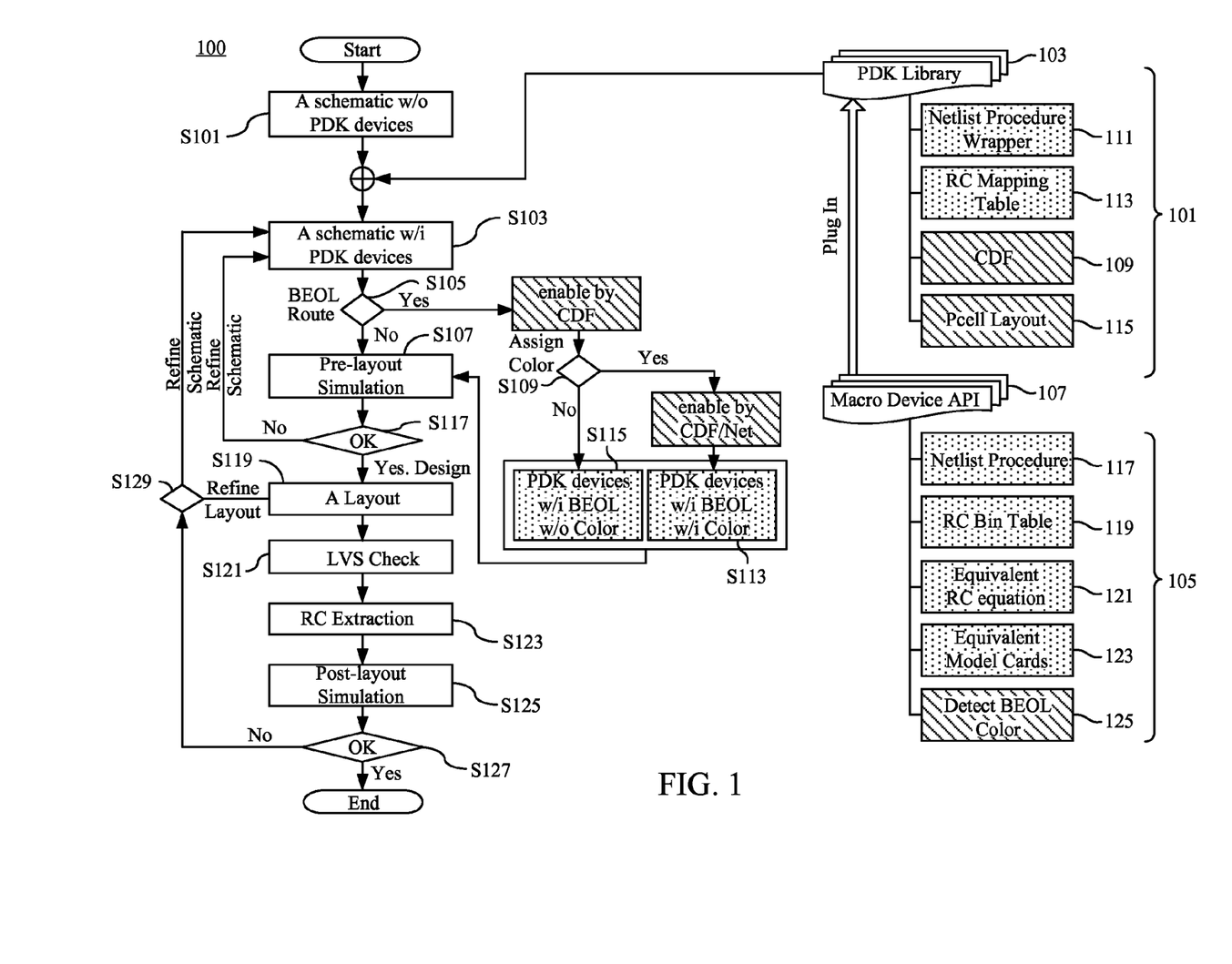
FIG. 1 is a flowchart of a method of modeling an integrated circuit, in accordance with one or more embodiments.

FIG. 1 is a flowchart of a method 100 of modeling an integrated circuit, in accordance with one or more embodiments. The method 100 is performed by execution of an EDA tool implemented by a processor such as processor 403 (FIG. 4) executing a set of instructions. Method 100 involves modifying one or more PDK files 101 that are included in a PDK library 103. The PDK files 101 are modified based on information, data and/or instructions included in one or more macro device files 105 that interface with the PDK library 103 by way of a macro device application programming interface (API) 107.

The macro device API 107 makes it possible to optionally include BEOL device and/or connection RC values in a schematic of a designed integrated circuit for observation by a circuit designer and use in a pre-layout and/or post-layout simulation of the designed integrated circuit. The macro device API 107 also makes it possible to selectively color a representation of a circuit component of the integrated circuit and/or a BEOL device or connection coupled with the circuit component of the integrated circuit in a schematic of the integrated circuit.

In the method 100, the optional inclusion of the BEOL RC values and the selective coloring of the representation of the circuit component and/or BEOL device or connection coupled with the circuit component is based on an instruction included in a modified component description format (CDF) file 109 included in the PDK files 101. In some embodiments, the macro device API 107 is a plug-in API. If the macro device API 107 is a plug-in API, the macro device API 107 is capable of interfacing with the EDA tool and/or the PDK library 103 as an add-on at a time after deployment of the EDA tool and/or the PDK library 103.

The PDK files 101 include a wrapper of netlist procedure file 111, a revised RC mapping table 113, CDF 109, and a parameterized cell (p-cell) layout file 115.

The wrapper of netlist procedure file 111 is an instruction executed by the EDA tool to switch between standard, unmodified, PDK device files included in the PDK library 103 and the PDK files 101 that include information provided in the macro device files 105, files modified based on the macro device files 105, and/or files revised based on the macro device files 105.

The RC mapping table 113 is a file included in a standard, unmodified, PDK file that is revised from a standard/unmodified state based on data included in the macro device files 105. The RC mapping table 113 is revised such that information included in the PDK device files is annotated based on information included in the macro device files 105. The RC mapping table 113 is annotated to prevent the EDA tool from using duplicate information provided by way of the PDK files 101 and the macro device files 105 in the schematic, at the pre-layout simulation stage, at the post-layout simulation stage, or in some other process in which the EDA tool might inadvertently use duplicative information in the design and simulation of an integrated circuit. For example, if an RC value is associated with a circuit component, and that RC value is provided to the EDA tool by way of the PDK files 101, and another RC value associated with the circuit component is provided to the EDA tool by way of the macro device files 105, to prevent from double counting parasitic effects associated with the RC values at the post-simulation stage, the RC value included in PDK files 101 (e.g., in the RC mapping table 113) is annotated to be used by the EDA tool for the circuit component, instead of an RC value associated with the circuit component that might be provided to the EDA tool by way of the macro device file 105.

The CDF 109 includes instructions that, when executed by the EDA tool, control macro device behavior and BEOL device and/or connection routing in at least the schematic. For controlling macro device behavior, CDF 109 includes instructions to determine in a design process whether BEOL devices and/or connections exist or should be included in a schematic of a designed integrated circuit. The CDF 109 also includes an instruction that, when executed by the EDA tool, control coloring of one or more BEOL devices and/or connections in the schematic of the integrated circuit. The CDF 109 is added to the PDK files 101 by way of the macro device API 107 based on an instruction included in the macro device files 105. In at least some embodiments, more than one CDF 109 is added to the PDK files 101.

The p-cell layout file 115 includes color BEOL routing data that is optionally enabled by an instruction included in a CDF 109 for a circuit component, and any connections coupled thereto, in the schematic of the integrated circuit. The p-cell layout file 115 includes an instruction to append the color of BEOL devices and/or connections in the schematic of the integrated circuit based on a detection of BEOL device and/or detection coloring at the pre-layout simulation stage. The p-cell layout file 115 is added to the PDK files 101 by way of the macro device API 107 based on an instruction included in the macro device files 105.

The macro device files 105 include a netlist procedure file 117, a macro RC look-up table 119, BEOL RC value determination equation files 121, equivalent model cards 123, and a detect BEOL device and/or connection color instruction file 125.

The netlist procedure file 117 includes an instruction that, when executed by the EDA tool, causes BEOL devices and/or connections coupled with the circuit component to be determined based on the schematic such that a macro netlist is generated that includes a circuit component and the BEOL device(s) and/or connections coupled thereto. The netlist includes an equivalent structure of the circuit component coupled with the BEOL device(s) and/or connections as a BEOL parasitic RC network. The netlist comprises connection details, device parameters, and RC values. The connection details describe the connections that couple the circuit component with a BEOL device. Device parameters include dimensions, materials, performance values, location information, design rules, or other suitable design factors associated with manufacturing the circuit component. The RC values included in the netlist include RC values associated with the circuit component, BEOL device(s) and/or connections near or coupled with the circuit component. The netlist also includes calculated colors related to the RC values included in the netlist for the circuit component, the connections coupled to the circuit component, and/or the BEOL device(s) coupled with the circuit component.

The macro RC look-up table 119 contains initial instance parameter values of parasitic BEOL device and/or connection RC values with and without color information. In some embodiments, the RC values included in the macro RC look-up table 119 are used by the EDA tool as RC values for one or more BEOL connections or devices that are coupled with the circuit component in the schematic.

BEOL RC value determination equation files 123 include instructions, linear equations and nonlinear equations. The BEOL RC value determination equation files 123 are used by the EDA tool to calculate an RC value and to determine a color associated with the RC value for BEOL devices and/or connections based on the EDA tool with which the macro device API 107 is associated. For example, in one embodiment, a first equation or set of equations is used to calculate the BEOL device and/or connection coloring. In another embodiment, a second equation or set of equations is used to calculate the BEOL device and/or connection coloring. The first equation or set of equations is used by a first type of EDA tool while the second equation or set of equations is used by a second type of EDA tool different from the first such that the BEOL device and/or connection coloring is appropriate for the type of EDA tool with which the macro device API 107 interfaces. In some embodiments, the EDA tool uses the RC values and/or the color information included in the macro RC look-up table 119 in the BEOL RC value determination equations to calculate the RC values and/or the BEOL device and/or connection coloring for one or more BEOL connections or devices that are coupled with the circuit component in the schematic. In some embodiments, the RC values are based on linear equations. In some embodiments, the RC values are bases on non-linear equations.

The equivalent model cards 123 define the structure of the BEOL devices and/or connections and the RC values associated with the BEOL devices and/or connections. In some embodiments, the equivalent model cards 123 are used by the EDA tool in addition to, or as an alternative of, model cards that are included in a standard PDK file as a source for information regarding a circuit component included in the schematic of an integrated circuit. The equivalent model cards 123 include RC value and/or coloring information that are based on the output of the calculations performed by the EDA tool based on the equivalent RC equations included in the equivalent RC equation file 121.

The detect BEOL device and/or connection color instruction file 125 is enabled by the CDF 109, and the EDA tool retrieves the BEOL RC bin table values or the equivalent RC values with or without color information for inclusion in the schematic of the integrated circuit. In some embodiments, the CDF 109 includes an instruction that, when executed by the EDA tool, turns the coloring of the circuit component on or off. The EDA tool uses the detect BEOL device and/or color instruction file 125 to include coloring of the BEOL device(s) and/or connections coupled to the circuit component in the schematic based on the instruction in the CDF 109. In some embodiments, the BEOL connections coupled with the circuit component are colored in the schematic based on the instruction included in the CDF 109 and the RC values associated with the BEOL connections. The BEOL device(s) and/or connections are determined based on the macro netlist, generated based on the netlist procedure 217, that includes the circuit component and the BEOL device(s) and/or connections coupled thereto.

The method 100 begins with step S101 in which a schematic of an integrated circuit is generated by execution of an EDA tool having an interface with the PDK library 103 and the macro device API 107. The integrated circuit comprises at least a first circuit component coupled with a second circuit component. The schematic comprises a first representation of the first circuit component.

In step S103, execution of the EDA tool causes the first representation to be replaced, in the schematic, with a second representation of the first circuit component. The second representation includes RC information for the first circuit component. The RC information is based on first RC data included in the PDK files 101 corresponding to the first circuit component and second RC data included in the macro device files 105 corresponding to the first circuit component. The second RC data is based on a relationship between the first circuit component and a second circuit component. The second representation includes the CDF file 109 that is generated based on data included in the macro device file 105. The second representation of the first circuit component is generated by coupling a first symbol representative of the first circuit component with a second symbol representative of the connection and includes the CDF file 109 which is added to the PDK files 101. The first symbol is included in the PDK files 101.

Execution of the EDA tool causes PDK file 101 to be modified based on the macro device files 105 to include a control module such as CDF 109 configured to selectively activate the coupling of the second symbol representative of the connection and the coloring of the second representation of the first circuit component. The PDK file 101 further comprises an RC data structure such as RC mapping table 113, including the first RC data. In some embodiments, the RC data structure is revised by the EDA tool by annotating the first RC data. The RC information includes the first RC data and the second RC data. The RC information in such an embodiment is determined using the annotated first RC data.

In step S105, execution of the EDA tool causes a determination to be made based on the instruction included in the CDF 109. If the CDF 109 does not include the instruction to include BEOL device(s) and/or connections in the schematic of the integrated circuit, the method proceeds to step S107. If the CDF 109 includes an instruction to include BEOL device(s) and/or connections in the schematic of the integrated circuit, the method proceeds to step S109.

In step S109, execution of the EDA tool causes a determination to be made based on whether the BEOL device and/or connection color information is to be included in the schematic. If yes, based on the netlist procedure 117 and the detect BEOL device and/or connection color instruction file 125, the method proceeds to step S113 in which the second representation of the first circuit component is selectively colored in the schematic based on the RC information. Execution of the EDA tool causes a color scheme to be assigned to the connection based on the RC value. The data describing the connection between the first circuit component and the second circuit component further comprises the assigned color scheme. The instruction included in the CDF 109 is executed by the processor such that the second symbol of the second representation of the first circuit component is colored in accordance with the color scheme assigned to the connection. For example, the first circuit component is colored in the schematic to illustrate an RC value associated with the first circuit component and/or one or more BEOL devices and/or connections coupled with the first circuit component are colored in accordance with an RC value associated with the one or more BEOL devices and/or connections based on the second RC data included in the macro device files 105. The RC information for the BEOL device(s) and/or connections coupled is used by the EDA tool at the pre-layout simulation stage. The coloring of the second representation is indicative of whether the integrated circuit is in compliance with a design specification. A circuit designer, at this point, has the opportunity to visually assess the schematic to determine if the coloring of the second representation indicates that the integrated circuit has anticipated RC values. If not, the circuit designer has the option to redesign the integrated circuit at the schematic stage without having to progress through the entire method, thereby saving time and effort. If the circuit designer decides to proceed to the pre-layout simulation stage based on the visual assessment of the schematic, then the method proceeds to step S107.

If the determination in step S109 is no, then the method proceeds to step S115 in which the RC information for the BEOL device(s) and/or connections is included in the RC information for use in the schematic of the integrated circuit and for consideration at the pre-layout simulation stage. The method then proceeds to step S107.

In step S107, execution of the EDA tool causes performance of a pre-layout simulation to test for one or more performance factors indicative of whether the designed integrated circuit performs as designed and/or is in compliance with one or more design rules or design specifications. Prior to performing the pre-layout simulation, if the schematic includes RC information and/or coloring of the circuit component and/or the BEOL device(s) and/or connections, then a circuit designer is able to visually see the parasitic effects that the RC information has on the designed integrated circuit. If the designed integrated circuit, at this point, appears to be outside of a design specification, then the designer is able to change the design of the integrated circuit without performing further steps in the method, thereby saving time and effort.

At step S117, execution of the EDA tool causes a determination to be made based on whether the pre-layout simulation outputs a result indicating that the designed integrated circuit will operate as designed. For example, if the pre-layout simulation result is within a predetermined threshold range, then the designed integrated circuit is determined to be capable of operating as designed. If yes, the method proceeds to step S119. If no, the method returns to step S103.

In step S119, execution of the EDA tool generates a layout of the designed integrated circuit based on the schematic. In step S121, execution of the EDA tool performs a LVS check. In step S123, execution of the EDA tool performs an RC extraction that determines RC values for the integrated circuit included in the layout. The RC values extracted comprise RC values for the circuit components of the integrated circuit and/or connections coupling the circuit components in the layout of in the integrated circuit.

In step S125, execution of the EDA tool performs a post-layout simulation on the layout of the integrated circuit. In step S127, execution of the EDA tool causes a determination to be made based on whether the results of the post-layout simulation indicate that the designed integrated circuit will perform as designed. For example, if the post-layout simulation result is within a predetermined threshold range, then the designed integrated circuit is determined to be capable of operating as designed. If yes, then the method ends. If no, then the method proceeds to step S129. In step S129, execution of the EDA tool causes a determination to be made based on whether a change should be made to the designed integrated circuit at the layout stage or at the schematic stage. For example, if the post-layout simulation result is outside of the predetermined threshold range by a deviation amount that is less than a re-design threshold limit, then execution of the EDA tool causes the method to return to the layout stage. If the post-layout simulation result is outside of the predetermined threshold range by a deviation amount that is greater than a re-design threshold limit, then execution of the EDA tool causes the method to return to the schematic stage. If the change should be made at the layout stage, then the method proceeds to step S119. If the change should be made at the schematic stage, then the method proceeds to step S103.

Figure 2:
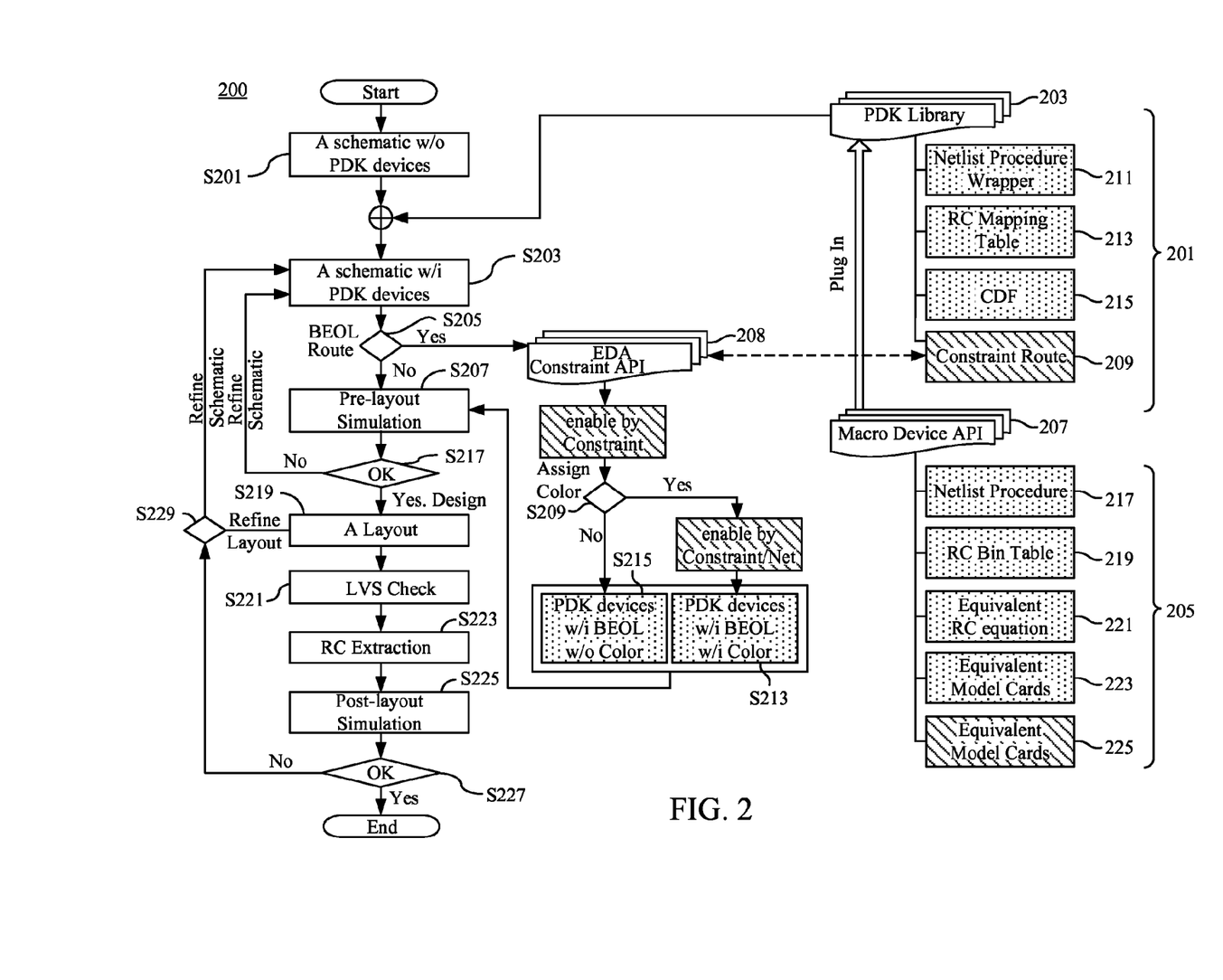
FIG. 2 is a flowchart of a method of modeling an integrated circuit, in accordance with one or more embodiments.

FIG. 2 is a flowchart of a method of modeling an integrated circuit, in accordance with one or more embodiments. The method 200 is performed by execution of an EDA tool implemented by a processor such as processor 403 (FIG. 4) executing a set of instructions. Method 200 involves modifying one or more PDK files 201 that are included in a PDK library 203. The PDK files 201 are modified based on information, data and/or instructions included in one or more macro device files 205 that interface with the PDK library 203 by way of a macro device application programming interface (API) 207 and design constraints added to the PDK files 201 by way of an EDA constraint API 208.

The macro device API 207 makes it possible to optionally include BEOL device and/or connection RC values in a schematic of a designed integrated circuit for observation by a circuit designer and use in a pre-layout and/or post-layout simulation of the designed integrated circuit. The macro device API 207 also makes it possible to selectively color a representation of a circuit component of the integrated circuit and/or a BEOL device or connection coupled with the circuit component of the integrated circuit in a schematic of the integrated circuit.

In the method 200, the optional inclusion of the BEOL RC values and the selective coloring of the representation of the circuit component and/or BEOL device or connection coupled with the circuit component is based on an instruction included in and a PDK constraint code file 209 included in the PDK files 201. In some embodiments, the macro device API 207 is a plug-in API. If the macro device API 207 is a plug-in API, the macro device API 207 is capable of interfacing with the EDA tool and/or the PDK library 203 as an add-on at a time after deployment of the EDA tool and/or the PDK library 203. In some embodiments, the EDA constraint API 208 is deployed with the EDA tool. In other embodiments, the EDA constraint API 208 is a plug-in API.

The PDK files 201 include a wrapper of netlist procedure file 211, a revised RC mapping table 213, constraint code file 209, and a CDF 215.

The wrapper of netlist procedure file 211 is an instruction executed by the EDA tool to switch between standard, unmodified, PDK device files included in the PDK library 203 and the PDK files 201 that include information provided in the macro device files 205, files modified based on the macro device files 205, and/or files revised based on the macro device files 205.

The RC mapping table 213 is a file included in a standard, unmodified, PDK file that is revised from a standard/unmodified state based on data included in the macro device files 205. The RC mapping table 213 is revised such that information included in the PDK device files is annotated based on information included in the macro device files 205. The RC mapping table 213 is annotated to prevent the EDA tool from using duplicate information provided by way of the PDK files 201 and the macro device files 205 in the schematic, at the pre-layout simulation stage, at the post-layout simulation stage, or in some other process in which the EDA tool might inadvertently use duplicative information in the design and simulation of an integrated circuit. For example, if an RC value is associated with a circuit component, and that RC value is provided to the EDA tool by way of the PDK files 201, and another RC value associated with the circuit component is provided to the EDA tool by way of the macro device files 205, to prevent from double counting parasitic effects associated with the RC values at the post-simulation stage, the RC value included in PDK files 201 (e.g., in the RC mapping table 213) is annotated to be used by the EDA tool for the circuit component, instead of an RC value associated with the circuit component that might be provided to the EDA tool by way of the macro device file 205.

The constraint code file 209 includes color BEOL routing data that is optionally enabled by an instruction included in the constraint code file 209 for a circuit component, and any connections coupled thereto, in the schematic of the integrated circuit. The instructions included in the constraint code file 209, when executed by the EDA tool, control BEOL device and/or connection routing in at least the schematic. The constraint code file 209 also includes an instruction that, when executed by the EDA tool, control coloring of one or more BEOL devices and/or connections in the schematic of the integrated circuit. The constraint code file 209 includes an instruction to append the color of BEOL devices and/or connections in the schematic of the integrated circuit based on a detection of BEOL device and/or detection coloring at the pre-layout simulation stage. The constraint code file 209 is added to the PDK files 201 by way of the EDA constraint API 208. In some embodiments, the constraint code file 209 is modified based on an instruction included in the macro device files 205, and the EDA tool, by way of the EDA constraint API 208, evaluates the constraint code file 209 for instructions or code modifications.

The CDF 215 includes instructions that, when executed by the EDA tool, control macro device behavior. For example CDF 215 includes instructions to determine in a design process whether BEOL devices and/or connections exist or should be included in a schematic of a designed integrated circuit. The CDF 215 is added to the PDK files 201 by way of the macro device API 207 based on an instruction included in the macro device files 205. In at least some embodiments, more than one CDF 215 is added to the PDK files 201.

The macro device files 205 include a netlist procedure file 217, a macro RC look-up table 219, BEOL RC value determination equation files 221, equivalent model cards 223, and a detect BEOL device and/or connection color instruction file 225.

The netlist procedure file 217 includes an instruction that, when executed by the EDA tool, causes BEOL devices and/or connections coupled with the circuit component to be determined based on the schematic such that a macro netlist is generated that includes a circuit component and the BEOL device(s) and/or connections coupled thereto. The netlist includes an equivalent structure of the circuit component coupled with the BEOL device(s) and/or connections as a BEOL parasitic RC network. The netlist comprises connection details, device parameters, and RC values. The connection details describe the connections that couple the circuit component with a BEOL device. Device parameters include dimensions, materials, performance values, location information, design rules, or other suitable design factors associated with manufacturing the circuit component. The RC values included in the netlist include RC values associated with the circuit component, BEOL device(s) and/or connections near or coupled with the circuit component. The netlist also includes calculated colors related to the RC values included in the netlist for the circuit component, the connections coupled to the circuit component, and/or the BEOL device(s) coupled with the circuit component.

The macro RC look-up table 219 contains initial instance parameter values of parasitic BEOL device and/or connection RC values with and without color information. In some embodiments, the RC values included in the macro RC look-up table 219 are used by the EDA tool as RC values for one or more BEOL connections or devices that are coupled with the circuit component in the schematic.

BEOL RC value determination equation files 221 include instructions, linear equations and nonlinear equations. The BEOL RC value determination equation files 221 are used by the EDA tool to calculate an RC value and to determine a color associated with the RC value for BEOL devices and/or connections based on the EDA tool with which the macro device API 207 is associated. For example, in one embodiment, a first equation or set of equations is used to calculate the BEOL device and/or connection coloring. In another embodiment, a second equation or set of equations is used to calculate the BEOL device and/or connection coloring. The first equation or set of equations is used by a first type of EDA tool while the second equation or set of equations is used by a second type of EDA tool different from the first such that the BEOL device and/or connection coloring is appropriate for the type of EDA tool with which the macro device API 207 interfaces. In some embodiments, the EDA tool uses the RC values and/or the color information included in the macro RC look-up table 219 in the BEOL RC value determination equations to calculate the RC values and/or the BEOL device and/or connection coloring for one or more BEOL connections or devices that are coupled with the circuit component in the schematic. In some embodiments, the RC values are based on linear equations. In some embodiments, the RC values are bases on non-linear equations.

The equivalent model cards 223 define the structure of the BEOL devices and/or connections and the RC values associated with the BEOL devices and/or connections. In some embodiments, the equivalent model cards 223 are used by the EDA tool in addition to, or as an alternative of, model cards that are included in a standard PDK file as a source for information regarding a circuit component included in the schematic of an integrated circuit. The equivalent model cards 223 include RC value and/or coloring information that are based on the output of the calculations performed by the EDA tool based on the equivalent RC equations included in the equivalent RC equation file 221.

The detect BEOL device and/or connection color instruction file 225 is enabled by the constraint code file 209, and the EDA tool retrieves the BEOL RC bin table values or the equivalent RC values with or without color information for inclusion in the schematic of the integrated circuit. In some embodiments, the constraint code file 209 includes an instruction that, when executed by the EDA tool, turns the coloring of the circuit component and/or the BEOL device(s) or connections on or off. In some embodiments, the instruction is embedded in the source code of the constraint code file 209, and the EDA tool evaluates the source code by way of the EDA constraint API 208 to assign colors to the circuit component and/or the BEOL device(s) or connections. In some embodiments, rather than including an explicit instruction for coloring the circuit component and/or BEOL device(s) or connections, the EDA tool evaluates the source code of the constraint code file 209 to determine if the color for the BEOL device(s) and/or connections is to be included in the schematic of the integrated circuit. In some embodiments, the BEOL connections coupled with the circuit component are colored in the schematic based on the instruction in or the source code included of the constraint code file 209 and the RC values associated with the BEOL connections, and the BEOL device(s) and/or connections are determined based on the macro netlist that includes the circuit component and the BEOL device(s) and/or connections coupled thereto, generated based on the netlist procedure 217.

The method 200 begins with step S201 in which a schematic of an integrated circuit is generated by execution of an EDA tool having an interface with the PDK library 203 and the macro device API 207. The integrated circuit comprises at least a first circuit component coupled with a second circuit component. The schematic comprises a first representation of the first circuit component.

In step S203, execution of the EDA tool causes the first representation to be replaced, in the schematic, with a second representation of the first circuit component. The second representation includes RC information for the first circuit component. The RC information is based on first RC data included in the PDK files 201 corresponding to the first circuit component and second RC data included in the macro device files 205 corresponding to the first circuit component. The second RC data is based on a relationship between the first circuit component and a second circuit component. The second representation includes the CDF file 215 that is generated based on data included in the macro device file 205 and the constraint code file 209. The second representation of the first circuit component is generated by coupling a first symbol representative of the first circuit component with a second symbol representative of the connection and includes the CDF file 209 which is added to the PDK files 201. The first symbol is included in the PDK files 201.

Execution of the EDA tool causes the PDK file 201 to be modified based on the macro device files 205 to include a control module such as constraint code file 209 configured to selectively activate the coupling of the second symbol representative of the connection and the coloring of the second representation of the first circuit component. The PDK file 201 further comprises an RC data structure such as RC mapping table 213, including the first RC data. In some embodiments, the RC data structure is revised by the EDA tool by annotating the first RC data. The RC information includes the first RC data and the second RC data. The RC information in such an embodiment is determined using the annotated first RC data.

In step S205, execution of the EDA tool causes a determination to be made based on the instruction included in the constraint code file 209. If the constraint code file 209 does not include the instruction to include BEOL device(s) and/or connections in the schematic of the integrated circuit, the method proceeds to step S207. If the constraint code file 209 includes an instruction to include BEOL device(s) and/or connections in the schematic of the integrated circuit, the method proceeds to step S209.

In step S209, execution of the EDA tool causes a determination to be made based on whether the BEOL device and/or connection color information is to be included in the schematic. If yes, based on the netlist procedure 217 and the detect BEOL device and/or connection color instruction file 225, the method proceeds to step S213 in which the second representation of the first circuit component is selectively colored in the schematic based on the RC information. Execution of the EDA tool causes a color scheme to be assigned to the connection based on the RC value. The data describing the connection between the first circuit component and the second circuit component further comprises the assigned color scheme. The instruction included in the constraint code file 209 is executed by the processor such that the second symbol of the second representation of the first circuit component is colored in accordance with the color scheme assigned to the connection. For example, the first circuit component is colored in the schematic to illustrate an RC value associated with the first circuit component and/or one or more BEOL devices and/or connections coupled with the first circuit component are colored in accordance with an RC value associated with the one or more BEOL devices and/or connections based on the second RC data included in the macro device files 205. The RC information for the BEOL device(s) and/or connections coupled is used by the EDA tool at the pre-layout simulation stage. The coloring of the second representation is indicative of whether the integrated circuit is in compliance with a design specification. A circuit designer, at this point, has the opportunity to visually assess the schematic to determine if the coloring of the second representation indicates that the integrated circuit has anticipated RC values. If not, the circuit designer has the option to redesign the integrated circuit at the schematic stage without having to progress through the entire method, thereby saving time and effort. If the circuit designer decides to proceed to the pre-layout simulation stage based on the visual assessment of the schematic, then the method proceeds to step S207.

If the determination in step S209 is no, then the method proceeds to step S215 in which the RC information for the BEOL device(s) and/or connections is included in the RC information for use in the schematic of the integrated circuit and for consideration at the pre-layout simulation stage. The method then proceeds to step S207.

In step S207, execution of the EDA tool causes performance of a pre-layout simulation to test for one or more performance factors indicative of whether the designed integrated circuit performs as designed and/or is in compliance with one or more design rules or design specifications. Prior to performing the pre-layout simulation, if the schematic includes RC information and/or coloring of the circuit component and/or the BEOL device(s) and/or connections, then a circuit designer is able to visually see the parasitic effects that the RC information has on the designed integrated circuit. If the designed integrated circuit, at this point, appears to be outside of a design specification, then the designer is able to change the design of the integrated circuit without performing further steps in the method, thereby saving time and effort.

At step S217, execution of the EDA tool causes a determination to be made based on whether the pre-layout simulation outputs a result indicating that the designed integrated circuit will operate as designed. For example, if the pre-layout simulation result is within a predetermined threshold range, then the designed integrated circuit is determined to be capable of operating as designed. If yes, the method proceeds to step S219. If no, the method returns to step S203.

In step S219, execution of the EDA tool generates a layout of the designed integrated circuit based on the schematic. In step S221, execution of the EDA tool performs a LVS check. In step S223, execution of the EDA tool performs an RC extraction that determines RC values for the integrated circuit included in the layout. The RC values extracted comprise RC values for the circuit components of the integrated circuit and/or connections coupling the circuit components in the layout of in the integrated circuit.

In step S225, execution of the EDA tool performs a post-layout simulation on the layout of the integrated circuit. In step S227, execution of the EDA tool causes a determination to be made based on whether the results of the post-layout simulation indicate that the designed integrated circuit will perform as designed. For example, if the post-layout simulation result is within a predetermined threshold range, then the designed integrated circuit is determined to be capable of operating as designed. If yes, then the method ends. If no, then the method proceeds to step S229. In step S229, execution of the EDA tool causes a determination to be made based on whether a change should be made to the designed integrated circuit at the layout stage or at the schematic stage. For example, if the post-layout simulation result is outside of the predetermined threshold range by a deviation amount that is less than a re-design threshold limit, then execution of the EDA tool causes the method to return to the layout stage. If the post-layout simulation result is outside of the predetermined threshold range by a deviation amount that is greater than a re-design threshold limit, then execution of the EDA tool causes the method to return to the schematic stage. If the change should be made at the layout stage, then the method proceeds to step S219. If the change should be made at the schematic stage, then the method proceeds to step S203.

Figure 3:
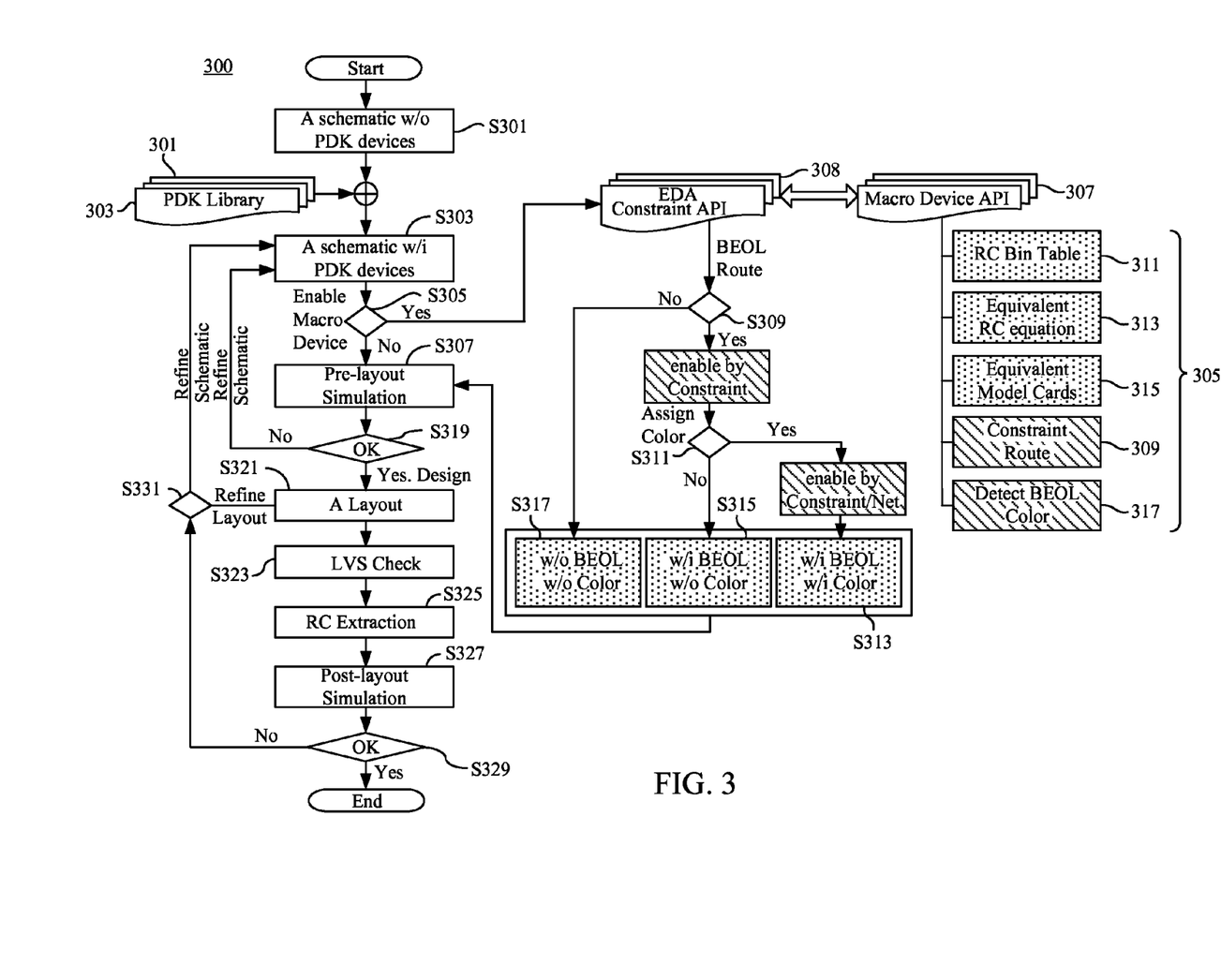
FIG. 3 is a flowchart of a method of modeling an integrated circuit, in accordance with one or more embodiments.

FIG. 3 is a flowchart of a method 300 of modeling an integrated circuit, in accordance with one or more embodiments. The method 300 is performed by execution of an EDA tool implemented by a processor such as processor 403 (FIG. 4) executing a set of instructions. Method 300 involves using standard, unmodified, PDK files 301 that are included in a PDK library 303 and incorporating RC information, RC data, and/or color data information into a schematic of the integrated circuit based on information, data and/or instructions included in one or more macro device files 305 that interface with an EDA tool used to design and simulate the integrated circuit by way of a macro device application programming interface (API) 307 and design constraints provided to the EDA tool by way of an EDA constraint API 308. The design constraints provided by way of the EDA constraint API 308 are added to the macro device files 305 and modified based on an instruction included in the macro device files 305.

The macro device API 307 makes it possible to optionally include BEOL device and/or connection RC values in a schematic of a designed integrated circuit for observation by a circuit designer and use in a pre-layout and/or post-layout simulation of the designed integrated circuit. The macro device API 307 also makes it possible to selectively color a representation of a circuit component of the integrated circuit and/or a BEOL device or connection coupled with the circuit component of the integrated circuit in a schematic of the integrated circuit.

In the method 300, the optional inclusion of the BEOL RC values and the selective coloring of the representation of the circuit component and/or BEOL device or connection coupled with the circuit component is based on an instruction included in and a PDK constraint code file 309 included in the macro device files 305. In some embodiments, the macro device API 307 is a plug-in API. If the macro device API 307 is a plug-in API, the macro device API 307 is capable of interfacing with the EDA tool and/or the EDA constraint API 308 as an add-on at a time after deployment of the EDA tool and/or the EDA constraint API 308. In some embodiments, the EDA constraint API 308 is deployed with the EDA tool. In other embodiments, the EDA constraint API is a plug-in API.

The PDK files 301 include RC information corresponding to a circuit component of the integrated circuit. The PDK files 301 also include information such as circuit component dimensions, design parameters, design rules, materials, symbols for representing the circuit component in a schematic, or other suitable information used in the design of an integrated circuit using an EDA tool.

The macro device files 305 include the constraint code file 309, a macro RC look-up table 311, BEOL RC value determination equation files 313, equivalent model cards 315, and a detect BEOL device and/or connection color instruction file 317.

The constraint code file 309 includes color BEOL routing data that is optionally enabled by an instruction included in the constraint code file 309 for a circuit component, and any connections coupled thereto, in the schematic of the integrated circuit. The instructions included in the constraint code file 309, when executed by the EDA tool, control BEOL device and/or connection routing in at least the schematic. The code file 309 also includes an instruction that, when executed by the EDA tool, control coloring of one or more BEOL devices and/or connections in the schematic of the integrated circuit. The constraint code file 309 includes an instruction to append the color of BEOL devices and/or connections in the schematic of the integrated circuit based on a detection of BEOL device and/or detection coloring at the pre-layout simulation stage. The constraint code file 309 is added to the macro device files 305 by way of the EDA constraint API 308. In some embodiments, the constraint code file 309 is modified based on based on an instruction included in the macro device files 305, and the EDA tool, by way of the EDA constraint API 308, evaluates the constraint code file 309 for instructions or code modifications.

The macro RC look-up table 311 contains initial instance parameter values of parasitic BEOL device and/or connection RC values with and without color information. In some embodiments, the RC values included in the macro RC look-up table 311 are used by the EDA tool as RC values for one or more BEOL connections or devices that are coupled with the circuit component in the schematic.

BEOL RC value determination equation files 313 include instructions, linear equations and nonlinear equations. The BEOL RC value determination equation files 313 are used by the EDA tool to calculate an RC value and to determine a color associated with the RC value for BEOL devices and/or connections based on the EDA tool with which the macro device API 307 is associated. For example, in one embodiment, a first equation or set of equations is used to calculate the BEOL device and/or connection coloring. In another embodiment, a second equation or set of equations is used to calculate the BEOL device and/or connection coloring. The first equation or set of equations is used by a first type of EDA tool while the second equation or set of equations is used by a second type of EDA tool different from the first such that the BEOL device and/or connection coloring is appropriate for the type of EDA tool with which the macro device API 307 interfaces. In some embodiments, the EDA tool uses the RC values and/or the color information included in the macro RC look-up table 311 in the BEOL RC value determination equations to calculate the RC values and/or the BEOL device and/or connection coloring for one or more BEOL connections or devices that are coupled with the circuit component in the schematic. In some embodiments, the RC values are based on linear equations. In some embodiments, the RC values are bases on non-linear equations.

The equivalent model cards 315 define the structure of the BEOL devices and/or connections and the RC values associated with the BEOL devices and/or connections. In some embodiments, the equivalent model cards 315 are used by the EDA tool in addition to, or as an alternative of, model cards that are included in the PDK files 301 as a source for information regarding a circuit component included in the schematic of an integrated circuit. The equivalent model cards 315 include RC value and/or coloring information that are based on the output of the calculations performed by the EDA tool based on the equivalent RC equations included in the equivalent RC equation file 313.

The detect BEOL device and/or connection color instruction file 317 is enabled by the constraint code file 309, and the EDA tool retrieves the BEOL RC bin table values or the equivalent RC values with or without color information for inclusion in the schematic of the integrated circuit. In some embodiments, the constraint code file 309 includes an instruction that, when executed by the EDA tool, turns the coloring of the circuit component and/or the BEOL device(s) or connections on or off. In some embodiments, the instruction is embedded in the source code of the constraint code file 309, and the EDA tool evaluates the source code by way of the EDA constraint API 308 to assign colors to the circuit component and/or the BEOL device(s) or connections. In some embodiments, rather than including an explicit instruction for coloring the circuit component and/or BEOL device(s) or connections, the EDA tool evaluates the source code of the constraint code file 309 to determine if the color for the BEOL device(s) and/or connections is to be included in the schematic of the integrated circuit. In some embodiments, the BEOL connections coupled with the circuit component are colored in the schematic based on the instruction in or the source code included of the constraint code file 309 and the RC values associated with the BEOL connections.

The method 300 begins with step S301 in which a schematic of an integrated circuit is generated by execution of an EDA tool having an interface with the PDK library 303 and the macro device API 307 by way of the EDA constraint API 308. The integrated circuit comprises at least a first circuit component coupled with a second circuit component. The schematic comprises a first representation of the first circuit component.

In step S303, execution of the EDA tool causes the first representation to be replaced, in the schematic, with a second representation of the first circuit component. The second representation includes RC information for the first circuit component. The RC information is based on first RC data included in the PDK files 301 corresponding to the first circuit component.

In step S305, execution of the EDA tool causes a determination to be made based on the instruction included in the constraint code file 309. The constraint code file 309 is evaluated by the EDA tool by way of the EDA constraint API 308. If the constraint code file 309 does not include the instruction to include BEOL device(s) and/or connections in the schematic of the integrated circuit, the method proceeds to step S307. If the constraint code file 309 includes an instruction to include BEOL device(s) and/or connections in the schematic of the integrated circuit, the method proceeds to step S309.

In step S309, execution of the EDA tool causes a determination to be made based on whether the BEOL device and/or connection RC information is to be included in the schematic. If the determination in step S309 is yes, based on the constraint code file 309 as evaluated by the EDA tool via the EDA constraint API 308, then the method proceeds to step S311 in which execution of the EDA tool causes a determination to be made based on whether the BEOL device and/or connection color information is to be included in the schematic of the integrated circuit. If the determination in step S311 is yes, then the method proceeds to step S313. If the determination in step S311 is no, then the method proceeds to step S315.

If the determination made in step S309 is no, then the method proceeds to step S317 where no RC information or coloring is added to the schematic for the BEOL device(s) and/or connections. The method then proceeds to step S307.

In steps S315 and S313, execution of the EDA tool causes second RC data included in the macro device files 305 to be included in the schematic of the integrated circuit. The second RC data is based on a relationship between the first circuit component and a second circuit component. The second representation of the first circuit component is generated by coupling a first symbol representative of the first circuit component with a second symbol representative of the connection and includes the second RC data. The first symbol is included in the PDK files 301.

In step S313, execution of the EDA tool causes the second representation of the first circuit component to be selectively colored in the schematic based on the RC values and coloring information included in the macro device files 305. Execution of the EDA tool causes a color scheme to be assigned to the BEOL device(s) and/or connections based on the RC value. The data describing the connection between the first circuit component and the second circuit component further comprises the assigned color scheme. The instruction included in the constraint code file 309 is executed by the processor such that the second symbol of the second representation of the first circuit component is colored in accordance with the color scheme assigned to the BEOL device and/or connection. For example, the first circuit component is colored in the schematic to illustrate an RC value associated with the first circuit component and/or one or more BEOL devices and/or connections coupled with the first circuit component are colored in accordance with an RC value associated with the one or more BEOL devices and/or connections based on the second RC data included in the macro device files 305. The RC information for the BEOL device(s) and/or connections coupled is used by the EDA tool at the pre-layout simulation stage. The coloring of the second representation is indicative of whether the integrated circuit is in compliance with a design specification. A circuit designer, at this point, has the opportunity to visually assess the schematic to determine if the coloring of the second representation indicates that the integrated circuit has anticipated RC values. If not, the circuit designer has the option to redesign the integrated circuit at the schematic stage without having to progress through the entire method, thereby saving time and effort. If the circuit designer decides to proceed to the pre-layout simulation stage based on the visual assessment of the schematic, then the method then proceeds to step S307.

In step S315, execution of the EDA tool causes the RC information for the BEOL device(s) and/or connections to be included in the RC information for use in the schematic of the integrated circuit and for consideration at the pre-layout simulation stage. The method then proceeds to step S307.

In step S307, execution of the EDA tool causes performance of a pre-layout simulation to test for one or more performance factors indicative of whether the designed integrated circuit performs as designed and/or is in compliance with one or more design rules or design specifications. Prior to performing the pre-layout simulation, if the schematic includes RC information and/or coloring of the circuit component and/or the BEOL device(s) and/or connections, then a circuit designer is able to visually see the parasitic effects that the RC information has on the designed integrated circuit. If the designed integrated circuit, at this point, appears to be outside of a design specification, then the designer is able to change the design of the integrated circuit without performing further steps in the method, thereby saving time and effort.

At step S319, execution of the EDA tool causes a determination to be made based on whether the pre-layout simulation outputs a result indicating that the designed integrated circuit will operate as designed. For example, if the pre-layout simulation result is within a predetermined threshold range, then the designed integrated circuit is determined to be capable of operating as designed. If yes, the method proceeds to step S321. If no, the method returns to step S303.

In step S321, execution of the EDA tool generates a layout of the designed integrated circuit based on the schematic. In step S323, execution of the EDA tool performs a LVS check. In step S325, execution of the EDA tool performs an RC extraction that determines RC values for the integrated circuit included in the layout. The RC values extracted comprise RC values for the circuit components of the integrated circuit and/or connections coupling the circuit components in the layout of in the integrated circuit.

In step S327, execution of the EDA tool performs a post-layout simulation on the layout of the integrated circuit. In step S329, execution of the EDA tool causes a determination to be made whether the results of the post-layout simulation indicate that the designed integrated circuit will perform as designed. For example, if the post-layout simulation result is within a predetermined threshold range, then the designed integrated circuit is determined to be capable of operating as designed. If yes, then the method ends. If no, then the method proceeds to step S331. In step S331, execution of the EDA tool causes a determination to be made based on whether a change should be made to the designed integrated circuit at the layout stage or at the schematic stage. For example, if the post-layout simulation result is outside of the predetermined threshold range by a deviation amount that is less than a re-design threshold limit, then execution of the EDA tool causes the method to return to the layout stage. If the post-layout simulation result is outside of the predetermined threshold range by a deviation amount that is greater than a re-design threshold limit, then execution of the EDA tool causes the method to return to the schematic stage. If the change should be made at the layout stage, then the method proceeds to step S321. If the change should be made at the schematic stage, then the method proceeds to step S303.

The processes described herein for generating a color-coded schematic of a designed IC, generating a layout of the designed IC, and synchronizing the color scheme assigned to the symbols representing the circuit components in the schematic to the circuit components in the layout of the designed IC such that the circuit components in the schematic and the layout have the same color scheme may be advantageously implemented via software in combination with hardware or firmware, hardware, firmware or a combination of software and firmware and/or hardware. For example, the processes described herein, may be advantageously implemented via a processor, Digital Signal Processing (DSP) chip, an Application Specific Integrated Circuit (ASIC), Field Programmable Gate Arrays FPGAs, etc. Such exemplary hardware for performing the described functions is detailed below.

Figure 4:
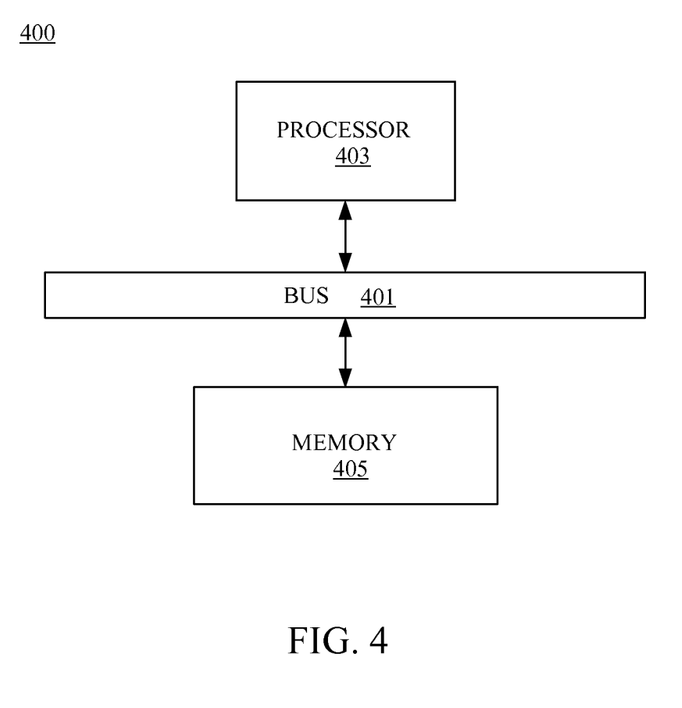
FIG. 4 is a functional block diagram of a computer or processor-based system upon which or by which an embodiment is implemented.

FIG. 4 is a functional block diagram of a computer or processor-based system 400 upon which or by which an embodiment is implemented.

Processor-based system 400 is programmed to model an integrated circuit, as described herein, and includes, for example, bus 401, processor 403, and memory 405 components.

In some embodiments, the processor-based system is implemented as a single "system on a chip." Processor-based system 400, or a portion thereof, constitutes a mechanism for modelling an integrated circuit. In some embodiments, the processor-based system 400 includes a communication mechanism such as bus 401 for transferring information and/or instructions among the components of the processor-based system 400. Processor 403 is connected to the bus 401 to obtain instructions for execution and process information stored in, for example, the memory 405. In some embodiments, the processor 403 is also accompanied with one or more specialized components to perform certain processing functions and tasks such as one or more digital signal processors (DSP), or one or more application-specific integrated circuits (ASIC). A DSP typically is configured to process real-world signals (e.g., sound) in real time independently of the processor 403. Similarly, an ASIC is configurable to perform specialized functions not easily performed by a more general purpose processor. Other specialized components to aid in performing the functions described herein optionally include one or more field programmable gate arrays (FPGA), one or more controllers, or one or more other special-purpose computer chips.

In one or more embodiments, the processor (or multiple processors) 403 performs a set of operations on information as specified by a set of instructions stored in memory 405 related to modelling an integrated circuit. The execution of the instructions causes the processor to perform specified functions.

The processor 403 and accompanying components are connected to the memory 405 via the bus 401. The memory 405 includes one or more of dynamic memory (e.g., RAM, magnetic disk, writable optical disk, etc.) and static memory (e.g., ROM, CD-ROM, etc.) for storing executable instructions that when executed perform the steps described herein to model an integrated circuit. The memory 405 also stores the data associated with or generated by the execution of the steps.

In one or more embodiments, the memory 405, such as a random access memory (RAM) or any other dynamic storage device, stores information including processor instructions for modeling an integrated circuit. Dynamic memory allows information stored therein to be changed. RAM allows a unit of information stored at a location called a memory address to be stored and retrieved independently of information at neighboring addresses. The memory 405 is also used by the processor 403 to store temporary values during execution of processor instructions. In various embodiments, the memory 405 is a read only memory (ROM) or any other static storage device coupled to the bus 401 for storing static information, including instructions, that is not changed. Some memory is composed of volatile storage that loses the information stored thereon when power is lost. In some embodiments, the memory 405 is a non-volatile (persistent) storage device, such as a magnetic disk, optical disk or flash card, for storing information, including instructions, that persists even when power supplied to the memory 405 is turned off.

The term "computer-readable medium" as used herein refers to any medium that participates in providing information to processor 403, including instructions for execution. Such a medium takes many forms, including, but not limited to computer-readable storage medium (e.g., non-volatile media, volatile media). Non-volatile media includes, for example, optical or magnetic disks. Volatile media include, for example, dynamic memory. Common forms of computer-readable media include, for example, a floppy disk, a flexible disk, a hard disk, a magnetic tape, another magnetic medium, a CD-ROM, CDRW, DVD, another optical medium, punch cards, paper tape, optical mark sheets, another physical medium with patterns of holes or other optically recognizable indicia, a RAM, a PROM, an EPROM, a FLASH-EPROM, an EEPROM, a flash memory, another memory chip or cartridge, or another medium from which a computer can read. The term computer-readable storage medium is used herein to refer to a computer-readable medium.

The systems and methods described herein provide seamless macro device design flows with color representation of BEOL parasitic RC effects for an accurate pre-layout simulation of a designed integrated circuit. An EDA tool that performs the above-described methods need only implement a schematic view to consider the parasitic effects of BEOL devices and/or connections on intrinsic PDK devices from the pre-layout simulation stage to the post-simulation stage. The discussed methods for including RC information and coloring for BEOL devices and/or connections reduce the effort spent in designing an integrated circuit, as well as the cycle time involved. The discussed systems and methods are applicable to any discrete or continuous color BEOL devices and/or connections coupled with or associated with a PDK device.

An aspect of this description relates to a method of modeling an integrated circuit. The method comprises generating, using a processor, a schematic of an integrated circuit. The integrated circuit comprises a first circuit component. The schematic comprises a first representation of the first circuit component. The method also comprises replacing, in the schematic, the first representation of the first circuit component with a second representation of the first circuit component. The second representation includes RC information for the first circuit component. The RC information is based on first RC data included in a PDK file corresponding to the first circuit component and second RC data included in a macro device file corresponding to the first circuit component. The second RC data is based on a relationship between the first circuit component and a second circuit component. The method further comprises selectively coloring the second representation of the first circuit component in the schematic based on the RC information. The coloring of the second representation is indicative of whether the integrated circuit is in compliance with a design specification.

Another aspect of this description relates to a method of modeling an integrated circuit. The method comprises generating, using a processor, a schematic of an integrated circuit. The integrated circuit comprises a first circuit component. The schematic comprises a first representation of the first circuit component. The method also comprises replacing, in the schematic, the first representation of the first circuit component with a second representation of the first circuit component. The second representation includes resistive capacitance information (RC) for the first circuit component. The RC information is based on first RC data included in a process design kit (PDK) file corresponding to the first circuit component and second RC data included in a component description format (CDF) file corresponding to the first circuit component. The second RC data is based on a relationship between the first circuit component and a second circuit component. The method further comprises selectively coloring the second representation of the first circuit component in the schematic based on the RC information and a PDK constraint code used to route a connection between the first circuit component and the second circuit component. The coloring of the second representation is indicative of whether the integrated circuit is in compliance with a design specification.

A further aspect of this description relates to a method of modeling an integrated circuit. The method comprises generating, using a processor, a schematic of an integrated circuit. The integrated circuit comprises a first circuit component. The schematic comprises a first representation of the first circuit component. The method also comprises replacing, in the schematic, the first representation of the first circuit component with a second representation of the first circuit component. The second representation includes resistive capacitance information (RC) for the first circuit component. The RC information is included in a process design kit (PDK) file corresponding to the first circuit component. The method further comprises selectively coloring the second representation of the first circuit component in the schematic based on the RC information and a constraint code used to route a connection between the first circuit component and a second circuit component. The coloring of the second representation is indicative of whether the integrated circuit is in compliance with a design specification.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of modeling an integrated circuit, the method comprising:
   including an application programming interface (API) in an integrated circuit design system comprising a processor; and
   using the processor:
      generating a schematic of an integrated circuit, the integrated circuit comprising a first circuit component, the schematic comprising a first representation of the first circuit component;
      replacing, in the schematic, the first representation of the first circuit component with a second representation of the first circuit component, the second representation including resistive capacitance (RC) information for the first circuit component, wherein the RC information is based on first RC data included in a process design kit (PDK) file corresponding to the first circuit component and second RC data included in a macro device file corresponding to the first circuit component, and the second RC data is based on a relationship between the first circuit component and a second circuit component;
   using the API:
      generating a component description format (CDF) file based on data included in the macro device file; and
      adding the CDF file to the PDK file; and
   selectively coloring the second representation of the first circuit component in the schematic based on the RC information,
   wherein
   the coloring of the second representation is indicative of whether the integrated circuit is in compliance with a design specification, and
   the second representation of the first circuit component is selectively colored based on an instruction included in the CDF file.

2. The method of claim 1, wherein the first circuit component is coupled with the second circuit component, and the macro device file comprises data describing a connection between the first circuit component and the second circuit component.

3. The method of claim 2, wherein the data describing the connection between the first circuit component and the second circuit component comprises an RC value associated with the connection, the method further comprising:
   generating, using the processor, the second representation of the first circuit component by coupling a first symbol representative of the first circuit component with a second symbol representative of the connection,
   wherein the first symbol is included in the PDK file.

4. The method of claim 3, further comprising:
   assigning, using the processor, a color scheme to the connection based on the RC value associated with the connection,
   wherein the data describing the connection between the first circuit component and the second circuit component further comprises the assigned color scheme, and the instruction included in the CDF is executed by the processor such that the second symbol of the second representation of the first circuit component is colored in accordance with the color scheme assigned to the connection.

5. The method of claim 4, wherein the API is a plug-in to a PDK library, the PDK library includes the PDK file, and the macro device file includes instructions that, when executed by the processor, cause the integrated circuit design system to detect the color scheme assigned to the connection and to include the color scheme assigned to the connection in the CDF file, thereby enabling the second symbol of the second representation of the first circuit component to be colored in accordance with the color scheme assigned to the connection.

6. The method of claim 5, wherein the PDK file is modified based on the macro device file to include a control module configured to selectively activate the coupling of the second symbol representative of the connection and the coloring of the second representation of the first circuit component.

7. The method of claim 1, wherein the PDK file further comprises an RC data structure including the first RC data, the RC data structure comprises the first RC data, and the method further comprises:
revising, using the API, the RC data structure by annotating the first RC data with the second RC data,
wherein the RC information is determined using the annotated first RC data.

8. The method of claim 1, wherein the including the API comprises adding the API to the integrated circuit modeling system as a plug-in API.

9. A method of modeling an integrated circuit, the method comprising:
including a first application programming interface (API) in an integrated circuit design system comprising a processor; and
using the processor:
generating a schematic of an integrated circuit, the integrated circuit comprising a first circuit component, the schematic comprising a first representation of the first circuit component;
replacing, in the schematic, the first representation of the first circuit component with a second representation of the first circuit component, the second representation including resistive capacitance (RC) information for the first circuit component, wherein the RC information is based on first RC data included in a process design kit (PDK) file corresponding to the first circuit component and second RC data included in a macro device file corresponding to the first circuit component, and the second RC data is based on a relationship between the first circuit component and a second circuit component; and
using the first API, selectively coloring the second representation of the first circuit component in the schematic based on the RC information and a PDK constraint code used to route a connection between the first circuit component and the second circuit component,
wherein the coloring of the second representation is indicative of whether the integrated circuit is in compliance with a design specification.

10. The method of claim 9, further comprising, using a second API:
generating a component description format (CDF) file based on data included in the macro device file; and
adding the CDF file to the PDK file,
wherein a first portion of the second representation of the first circuit component is selectively colored based on an instruction included in the CDF file, and a second portion of the second representation of the first circuit component is selectively colored based on the PDK constraint code.

11. The method of claim 10, wherein the macro device file comprises data describing the connection between the first circuit component and the second circuit component, the data describing the connection between the first circuit component and the second circuit component comprises an RC value associated with the connection, and the method further comprises:
generating, using the processor, the second representation of the first circuit component by coupling a first symbol representative of the first circuit component with a second symbol representative of the connection,
wherein the first symbol is included in the PDK file.

12. The method of claim 11, further comprising:
using the processor, assigning a color scheme to the connection based on the RC value,
wherein the PDK constraint code includes the assigned color scheme, and the second symbol of the second representation of the first circuit component is caused to be colored in accordance with the color scheme assigned to the connection by executing the PDK constraint code.

13. The method of claim 12, wherein the second API is a plug-in to a PDK library, the PDK library includes the PDK file, and the macro device file includes instructions that, when executed by the processor, cause the circuit design system to detect the color scheme assigned to the connection and to include the color scheme assigned to the connection in the PDK constraint code, thereby enabling the second symbol of the second representation of the first circuit component to be colored in accordance with the color scheme assigned to the connection.

14. The method of claim 13, wherein the PDK file is modified based on the macro device file to include the PDK constraint code.

15. The method of claim 10, wherein the PDK file further comprises an RC data structure including the first RC data, the RC data structure comprises the first RC data, and the method further comprises:
revising, using a second API included in the integrated circuit design system, the RC data structure by annotating the first RC data with the second RC data,
wherein the RC information is determined using the annotated first RC data.

16. A method of modeling an integrated circuit, the method comprising:
including a first application programming interface (API) in an integrated circuit design system comprising a processor; and
using the processor:
generating a schematic of an integrated circuit, the integrated circuit comprising a first circuit component, the schematic comprising a first representation of the first circuit component;
replacing, in the schematic, the first representation of the first circuit component with a second representation of the first circuit component, the second representation including resistive capacitance (RC) information for the first circuit component, the RC information being included in a process design kit (PDK) file corresponding to the first circuit component; and using the first API, selectively coloring the second representation of the first circuit component in the schematic based on the RC information and a constraint code used to route a connection between the first circuit component and a second circuit component, wherein the coloring of the second representation is indicative of whether the integrated circuit is in compliance with a design specification.

17. The method of claim 16, wherein
a first portion of the second representation of the first circuit component is selectively colored based on an instruction included in a macro device file, and
a second portion of the second representation of the first circuit component is selectively colored based on the constraint code.

18. The method of claim 17, wherein the macro device file comprises data describing the connection between the first circuit component and the second circuit component, the data describing the connection between the first circuit component and the second circuit component comprises an RC value associated with the connection, and the method further comprises:
generating, using the processor, the second representation of the first circuit component by coupling a first symbol representative of the first circuit component with a second symbol representative of the connection,
wherein the first symbol is included in the PDK file.

19. The method of claim 18, further comprising:
assigning, using the processor, a color scheme to the connection based on the RC value,
wherein the constraint code includes the assigned color scheme, and the second symbol of the second representation of the first circuit component is caused to be colored in accordance with the color scheme assigned to the connection by executing the constraint code.

20. The method of claim 19, wherein the constraint code is generated by a second API in the integrated circuit design system, the second API comprises instructions to interact with the first API, the first API is in communication with the integrated circuit design system, the first API comprises instructions that, when executed by the processor, cause the integrated circuit design system to detect the color scheme assigned to the connection and to include the color scheme assigned to the connection in the constraint code, thereby enabling the second symbol of the second representation of the first circuit component to be colored in accordance with the color scheme assigned to the connection.

* * * * *